(12) United States Patent
Esplin et al.

(10) Patent No.: US 11,506,254 B2
(45) Date of Patent: Nov. 22, 2022

(54) LOW PROFILE SHOCK ISOLATING MOUNT

(71) Applicant: Raytheon Company, Waltham, MA (US)

(72) Inventors: Roger C. Esplin, Marana, AZ (US); Peter H. Vo, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 153 days.

(21) Appl. No.: 16/883,912

(22) Filed: May 26, 2020

(65) Prior Publication Data

US 2021/0372501 A1   Dec. 2, 2021

(51) Int. Cl.
*F16F 15/02* (2006.01)
*B60K 5/12* (2006.01)

(52) U.S. Cl.
CPC .......... *F16F 15/022* (2013.01); *B60K 5/1208* (2013.01)

(58) Field of Classification Search
CPC combination set(s) only.
See application file for complete search history.

(56) References Cited

U.S. PATENT DOCUMENTS

| | | | |
|---|---|---|---|
| 5,551,661 A * | 9/1996 | Bunker | F16F 15/08 267/141 |
| 6,902,157 B2 * | 6/2005 | Brown | F16F 1/54 267/116 |
| 9,739,568 B2 * | 8/2017 | Dominguez | F42B 35/00 |
| 2012/0327230 A1 * | 12/2012 | Ellison | F16F 15/00 348/148 |
| 2016/0230928 A1 * | 8/2016 | Lewis | F16M 11/12 |
| 2017/0074619 A1 * | 3/2017 | Dominguez | F42B 35/00 |
| 2018/0007248 A1 * | 1/2018 | Zeise | G03B 15/006 |
| 2019/0316652 A1 * | 10/2019 | Vo | F16F 1/18 |
| 2020/0002028 A1 * | 1/2020 | Lamy | B64G 1/10 |

FOREIGN PATENT DOCUMENTS

| | | |
|---|---|---|
| EP | 1064098 A1 | 1/2001 |
| GB | 543917 A | 3/1942 |
| GB | 553793 A | 6/1943 |
| JP | 6355547 B2 | 7/2018 |
| JP | 2019-065887 A | 4/2019 |

OTHER PUBLICATIONS

International Search Report for International Application No. PCT/US2021/024457 dated Feb. 10, 2022, 15 pages.

* cited by examiner

*Primary Examiner* — Monica E Millner

(57) ABSTRACT

A low-profile shock isolating payload mounting assembly comprises a first mount, a second mount, and an isolator. The second mount is movable relative to the first mount and comprises a riser comprising an inclined surface. The isolator comprises an inner frame and an outer frame. The inner frame couples to the first mount and comprises a platform and a leg extending from the platform. The leg is inclined to be complementary to the inclined surface of the second mount. The outer frame couples to the second mount and comprises an opening for accessing the platform of the inner frame. The rail is inclined so as to be complementary to the leg to capture the leg between the rail of the outer frame and the inclined surface of the second mount. The isolator operates to dampen vibrations and shocks propagating between the first and second mounts.

20 Claims, 19 Drawing Sheets

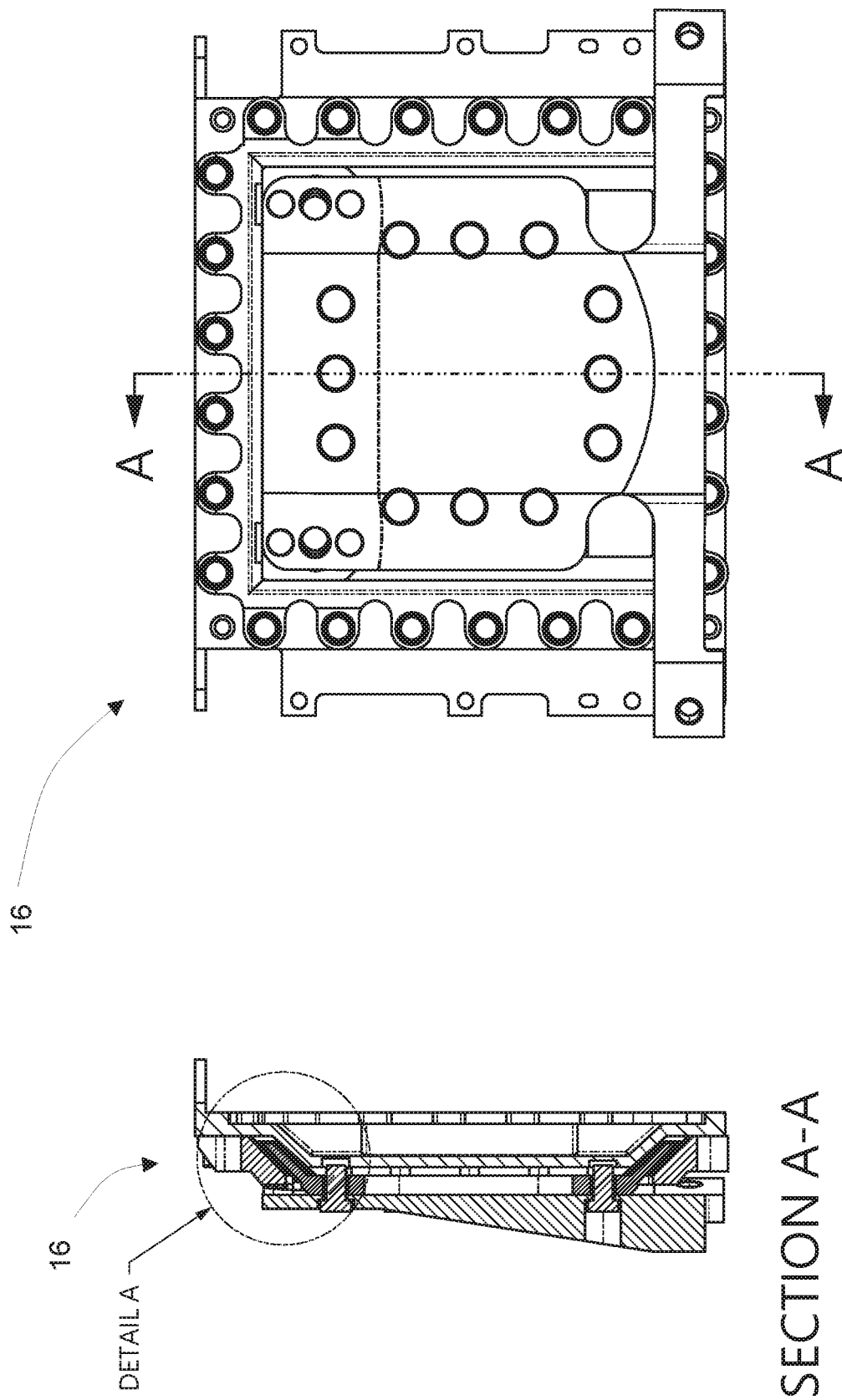

DETAIL A

LOW PROFILE SHOCK ISOLATING MOUNT

GOVERNMENT LICENSE RIGHTS

This invention was made with government support under contract HQ0276-15-C-0005 awarded by the United States Department of Defense. The government has certain rights in the invention.

BACKGROUND

A payload, such as an electronics component, can be mounted to a structure that may be subject to shock loads. For example, a payload such as a servo motor, may be mounted to a missile body. It is important to have a mounting system that secures the payload to the structure to prevent uncontrolled movement during use. However, a rigid coupling may transmit shock loads between the mounting system and the payload, potentially damaging the payload. For example, a servo motor in a multi-stage missile may require a secure mount to the missile body structure, but depending upon the type of mounting system used to secure the payload, the payload can be damaged if not isolated from shock loads induced within the missile and propagated to the mounting system during operation, such as the shock loads induced when the missile transitions between stages. Other devices, systems, and vehicle types other than a missile carrying a payload may also operate under conditions in which significant shock loads are present, and which may be transferred to the payload if the payload is not sufficiently isolated.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

FIG. 9 illustrates a side view of the low-profile shock isolating payload mounting assembly of FIG. 3.

FIG. 10 illustrates a cross-sectional view of the low-profile shock isolating payload mounting assembly of FIG. 3 taken about line AA of FIG. 9.

Figure 1:
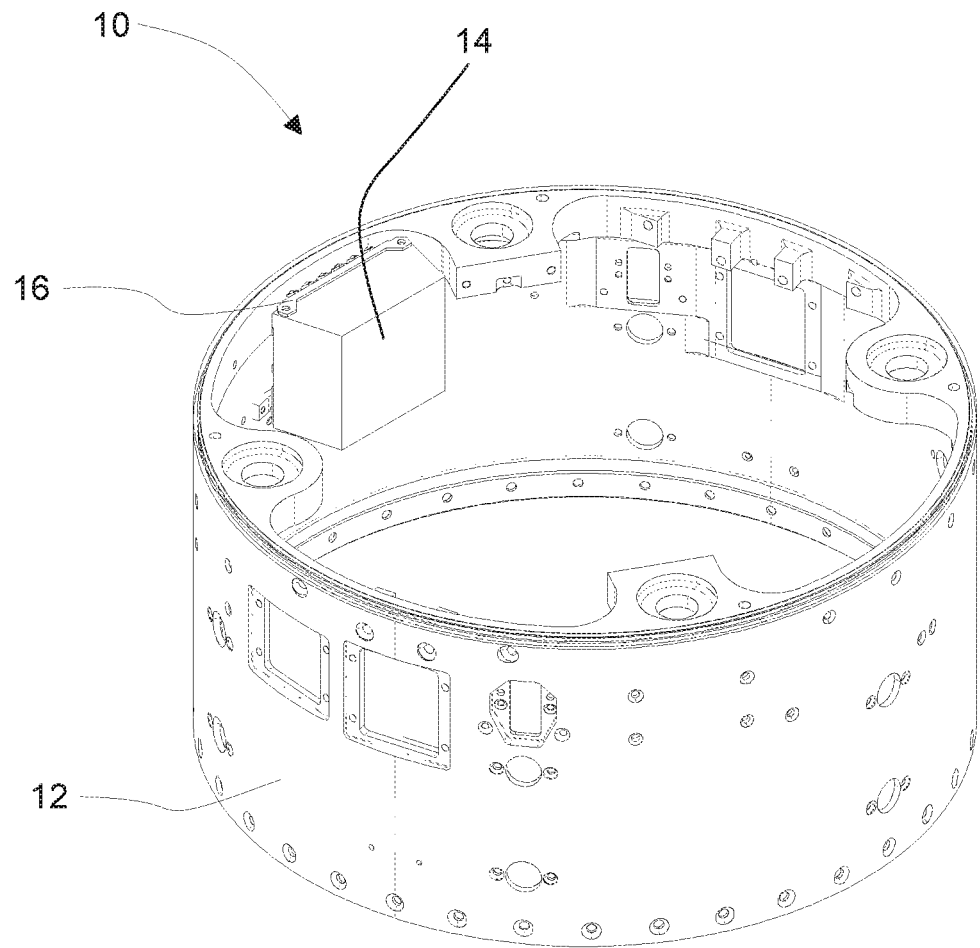
FIG. 1 illustrates a perspective view of a payload system showing a low-profile shock isolating payload mounting assembly coupling a payload to a cylindrical body in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

In one example, disclosed is a low-profile shock isolating payload mounting assembly. The low-profile shock isolating payload mounting assembly comprises a first mount, a second mount, and an isolator. The second mount is movable relative to the first mount and comprises at least one riser comprising at least one inclined surface. The isolator comprises an inner frame and an outer frame. The inner frame is configured to couple to the first mount and comprises a platform and at least one isolator support leg extending from the platform. The at least one isolator support leg is inclined so as to be complementary to the at least one inclined surface of the second mount. The outer frame is configured to couple to the second mount and comprises an opening for facilitating access to the platform of the inner frame, and at least one rail being inclined so as to be complementary to the at least one isolator support leg. The outer frame operates to capture the at least one isolator support leg between the at least one rail of the outer frame and the at least one inclined surface of the second mount. Upon at least one of the first mount and the second mount being subjected to vibrations and shocks, the isolator operates to dampen vibrations and shocks propagating between the first and second mounts.

In accordance with a more detailed aspect, the at least one riser can comprise a plurality of inclined surfaces, the inner frame can comprise a plurality of isolator support legs extending from the platform, and the outer frame can comprise a plurality of rails.

In accordance with a more detailed aspect, the isolator can further comprise at least one inner isolator pad situated between an inclined surface of the at least one inclined surface of the second mount and an isolator support leg of the at least one isolator support leg, and at least one outer isolator pad situated between a rail of the at least one rail of the outer frame and the isolator support leg.

In accordance with a more detailed aspect, at least one of the inner isolator pad and the outer isolator pad can comprise, or in other words can be formed of, an elastomeric material.

In accordance with a more detailed aspect, the inner frame can be configured to nest within the outer frame, or in other words, the inner and outer frames can comprise respective structural configurations that facilitate these being able to nest with one another.

In accordance with a more detailed aspect, one of the first mount and the second mount can be operable to mount to a payload support surface and the other of the first mount and the second mount can be operable to mount a payload to be supported by the payload support surface.

In accordance with a more detailed aspect, the first mount can be secured to the inner frame by one or more (e.g., a first plurality of) fasteners and the second mount can be secured to the outer frame by one or more (e.g., a second plurality of) fasteners.

In accordance with a more detailed aspect, the at least one isolator support leg can comprise a frustoconical shape.

In accordance with a more detailed aspect, the at least one isolator support leg can comprise a plurality of support legs.

Also disclosed is a payload system. The payload system comprises a body, a payload, and a low-profile shock isolating payload mounting assembly. The body has a payload support surface. The body and the payload support surface can be subject to vibration and shock type of loads. The payload is supported by the payload support surface. The low-profile shock isolating payload mounting assembly couples the payload to the payload support surface. The low-profile shock isolating payload mounting assembly comprises a first mount and a second mount. The first mount is coupled to one of the body and the payload. The second mount is movable relative to the first mount and coupled to the other of the body and the payload. The second mount comprises at least one riser comprising at least one inclined surface. The isolator comprises an inner frame and an outer frame. The inner frame is configured to couple to the first mount. The inner frame comprises a platform and at least one isolator support leg extending from the platform. The at least one isolator support leg is inclined so as to be complementary to the at least one inclined surface of the second mount. The outer frame is configured to couple to the second mount and comprises an opening for facilitating access to the platform of the inner frame and at least one rail being inclined so as to be complementary to the at least one isolator support leg. The outer frame operates to capture the at least one isolator support leg between the at least one rail of the outer frame and the at least one inclined surface of the second mount. When at least one of the body and the payload are subjected to vibrations and shocks, the isolator is operable to dampen vibrations and shocks propagating between the body and the payload.

In accordance with a more detailed aspect, the body can comprise an elongate cylindrical body and the payload support surface can comprise an interior cylindrical surface of the elongate cylindrical body. The body can comprise other shapes or configurations other than cylindrical.

In accordance with a more detailed aspect, the isolator can further comprise at least one inner isolator pad situated between an inclined surface of the at least one inclined surface of the second mount and an isolator support leg of the at least one isolator support leg and at least one outer pad situated between a rail of the at least one rail of the outer frame and the isolator support leg.

In accordance with a more detailed aspect, the at least one isolator support leg can comprise an inner isolator pad and an outer isolator pad.

In accordance with a more detailed aspect, the inner frame can nest within the outer frame.

In accordance with a more detailed aspect, the at least one isolator support leg can comprise a frustoconical shape.

In accordance with a more detailed aspect, the at least one isolator support leg can comprise a plurality of support legs.

Also is disclosed is a method for configuring a low-profile shock isolating payload mounting assembly. The method includes forming a first mount to be operable to couple to a support surface, forming a second mount to be operable to couple to a payload and to have at least one riser comprising at least one inclined surface, forming a second mount movable relative to the first mount, the second mount comprising at least one riser comprising at least one inclined surface, forming an inner frame to have a platform operable to couple to the first mount and at least one isolator support leg extending from the platform, the at least one isolator support leg being inclined so as to be complementary to the at least one incline surface of the second mount, and forming an outer frame operable to couple to the second mount and to have an opening for facilitating access to the platform of the inner frame to be operable to couple to the first mount and to have at least one rail inclined so as to be complementary to the at least one isolator support leg.

In accordance with a more detailed aspect, the method can further comprise forming the at least one isolator support leg to have a frustoconical shape.

In accordance with a more detailed aspect, the method can further comprise forming the at least one isolator support leg to comprise a plurality of support legs.

In accordance with a more detailed aspect, the method can further comprise attaching at least one isolator support pad to the at least one isolator support leg.

Figure 2:
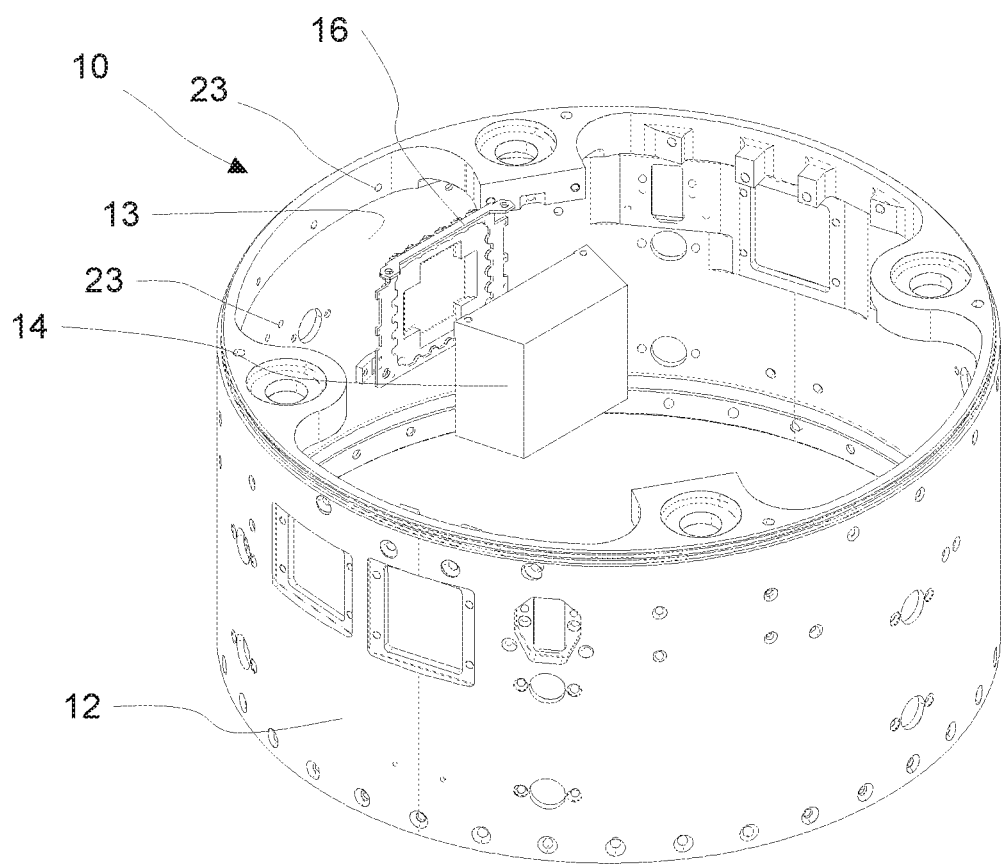
FIG. 2 illustrates an exploded view of the payload system and the low-profile shock isolating payload mounting assembly of FIG. 1.

To further describe the present technology, examples are now provided with reference to the figures. FIG. 1 illustrates an example payload system 10 comprising a body 12, a payload 14, and a low-profile shock isolating payload mounting assembly 16. FIG. 2 illustrates the example payload system 10 of FIG. 1 in an exploded view. The body 12 can be any body to which a payload 14 is mounted. In the example of FIG. 1, the body 12 is a tubular structure such as a missile segment. The body 12 can comprise a payload support surface 13 for supporting the payload 14. In the example of FIGS. 1 and 2, the payload support surface 13 is a cylindrical interior surface of the body 12. In other examples, payload support surfaces can be irregular or a flat mounting surface. The payload 14 can be any payload requiring mounting to the body 12 and that would benefit from being vibrationally isolated from the body 12. For example, the payload 14 can be electronics equipment that is sensitive to vibration and shock loads, such as a servo motor assembly. Those skilled in the art will recognize that the body 12 can comprise other shapes or configurations other than cylindrical. In addition, those skilled in the art will recognize that the payload 14 can comprise a variety of different types of payloads. As such, those illustrated in the drawings and discussed herein are not intended to be limiting in any way.

Figure 3:
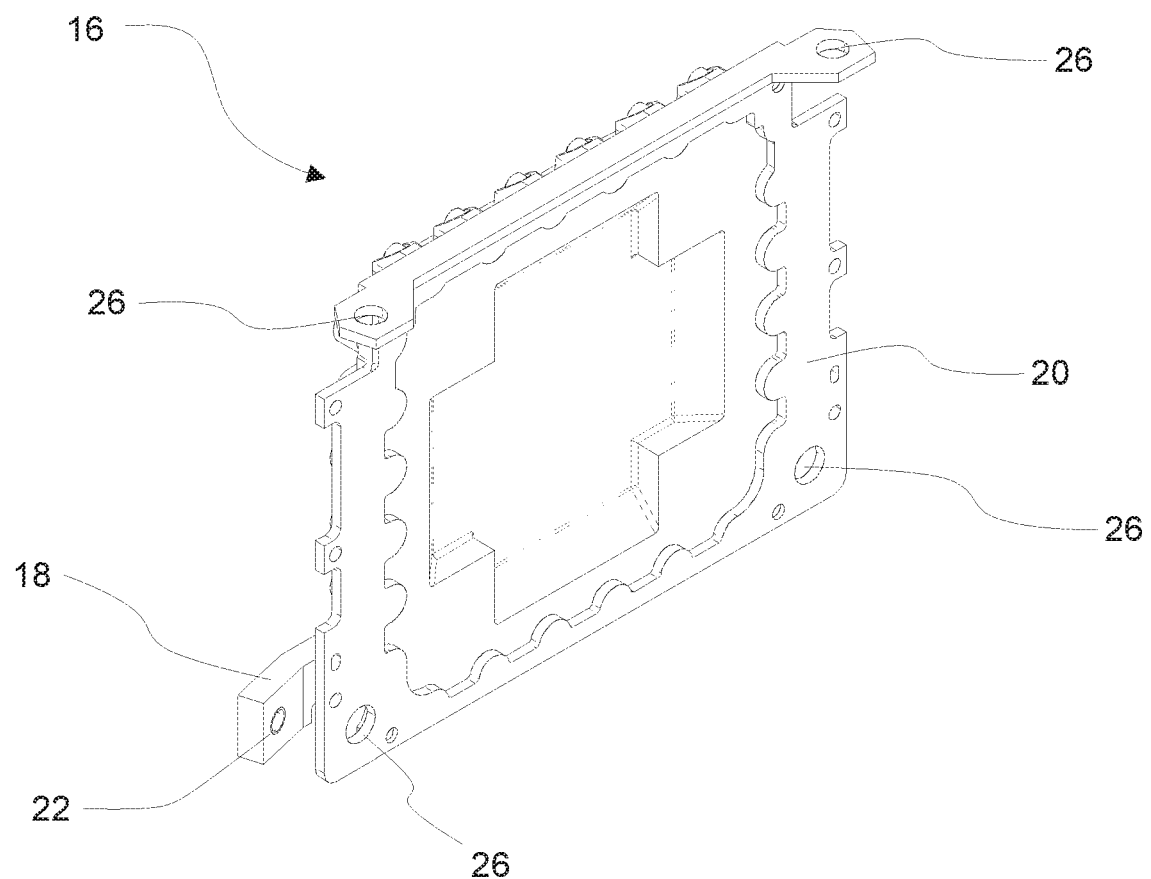
FIG. 3 illustrates a first perspective view of the low-profile shock isolating payload mounting assembly of FIG. 1 isolated from other components of the payload system.
Figure 4:
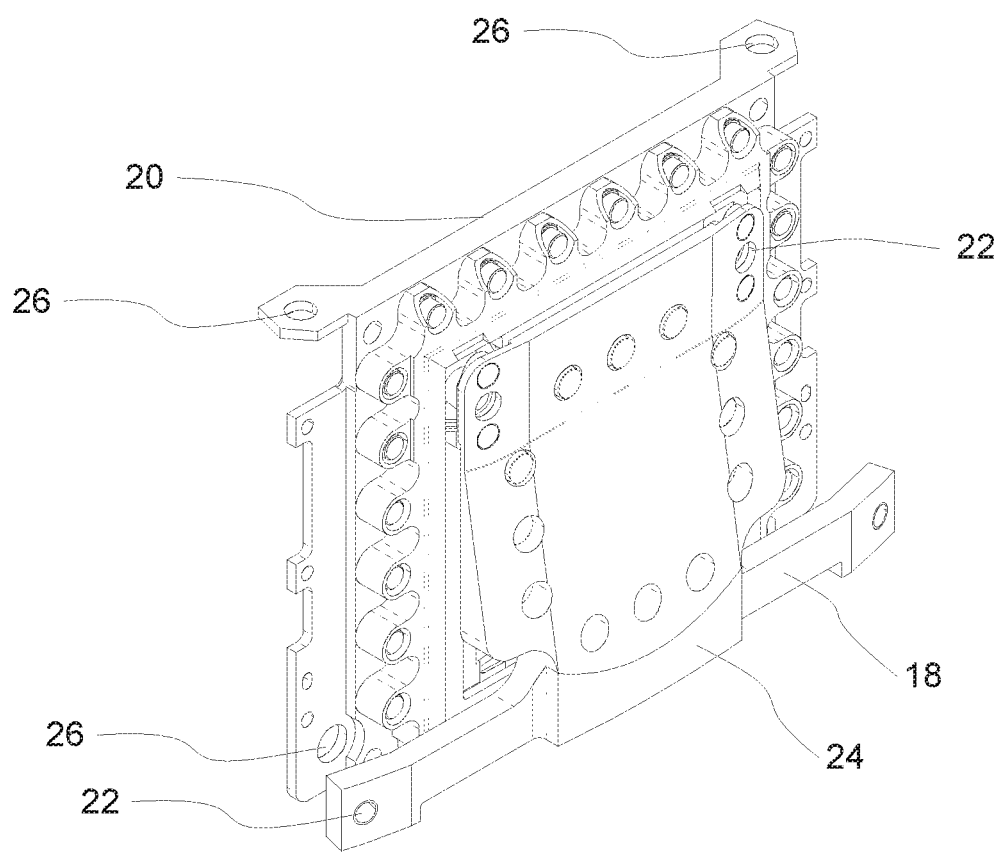
FIG. 4 illustrates a second perspective view of the low-profile shock isolating payload mounting assembly of FIG. 1 isolated from other components of the payload system.
Figure 5:
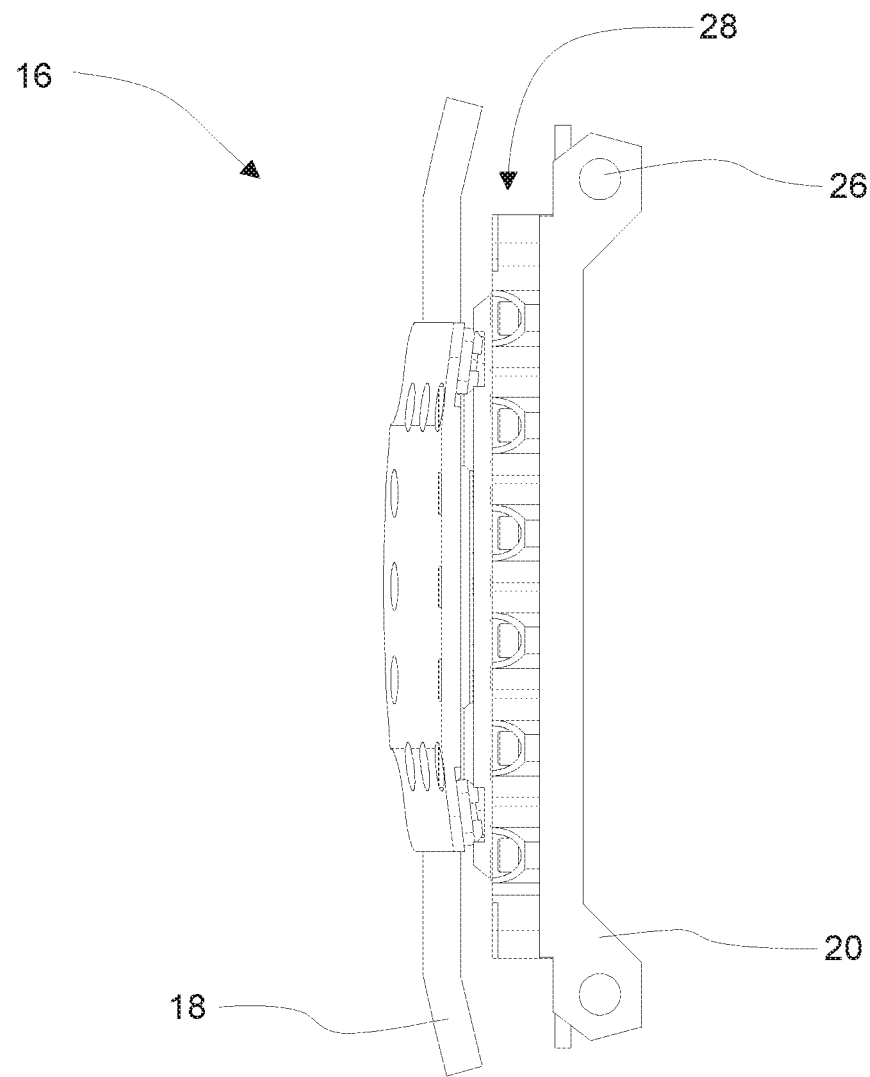
FIG. 5 illustrates top view of the low-profile shock isolating payload mounting assembly of FIG. 3.
Figure 6:
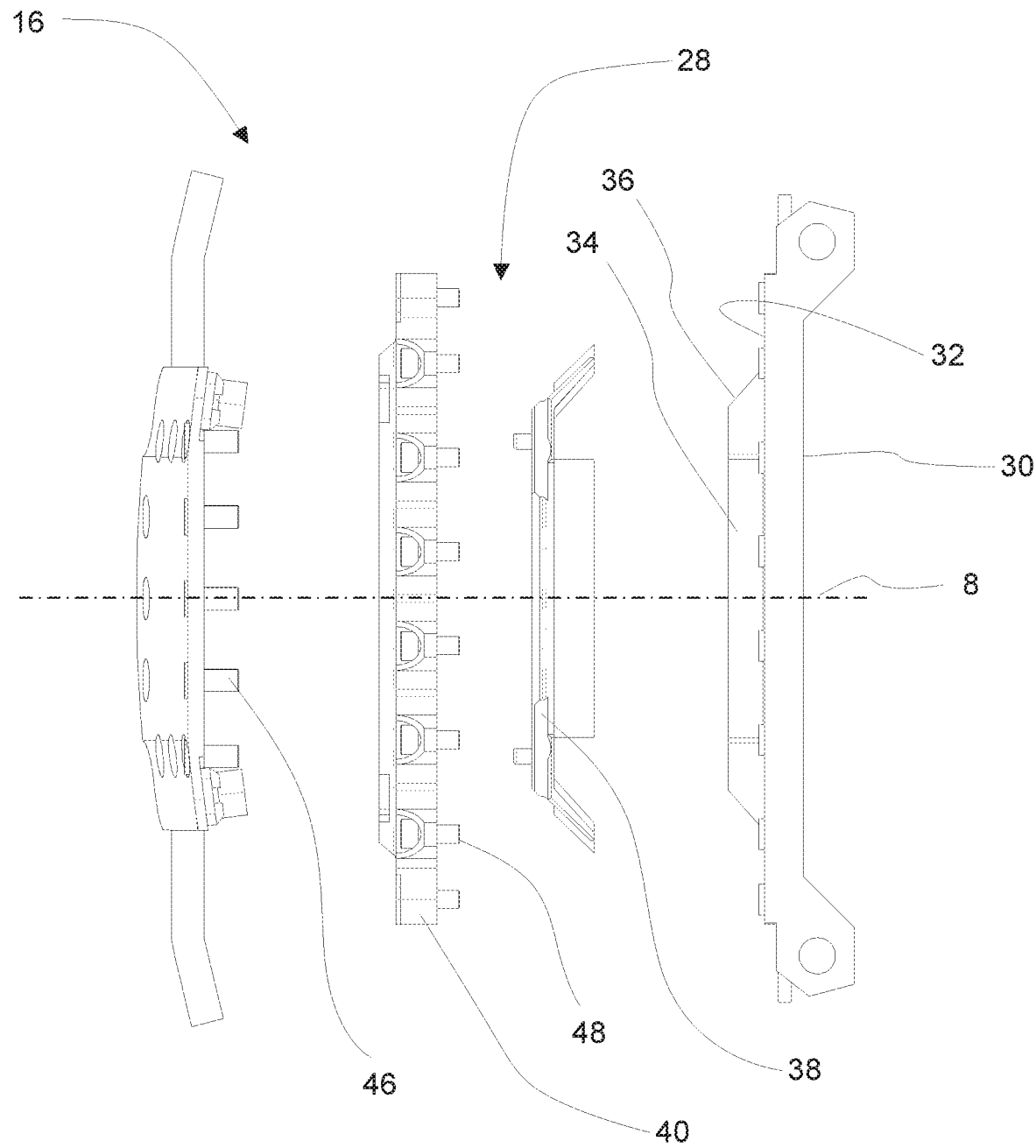
FIG. 6 illustrates an exploded top view of the low-profile shock isolating payload mounting assembly of FIG. 3.
Figure 7:
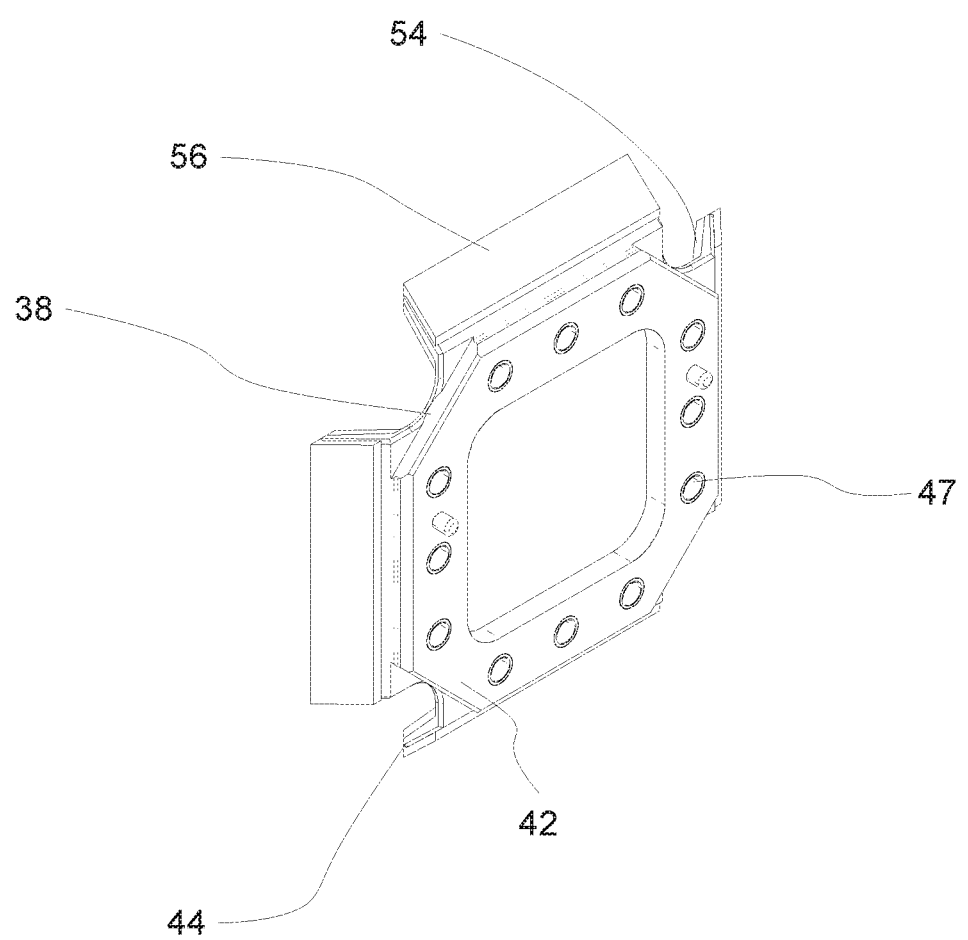
FIG. 7 illustrates a perspective view of an inner frame of an isolator of the low-profile shock isolating payload mounting assembly of FIG. 3.
Figure 8:
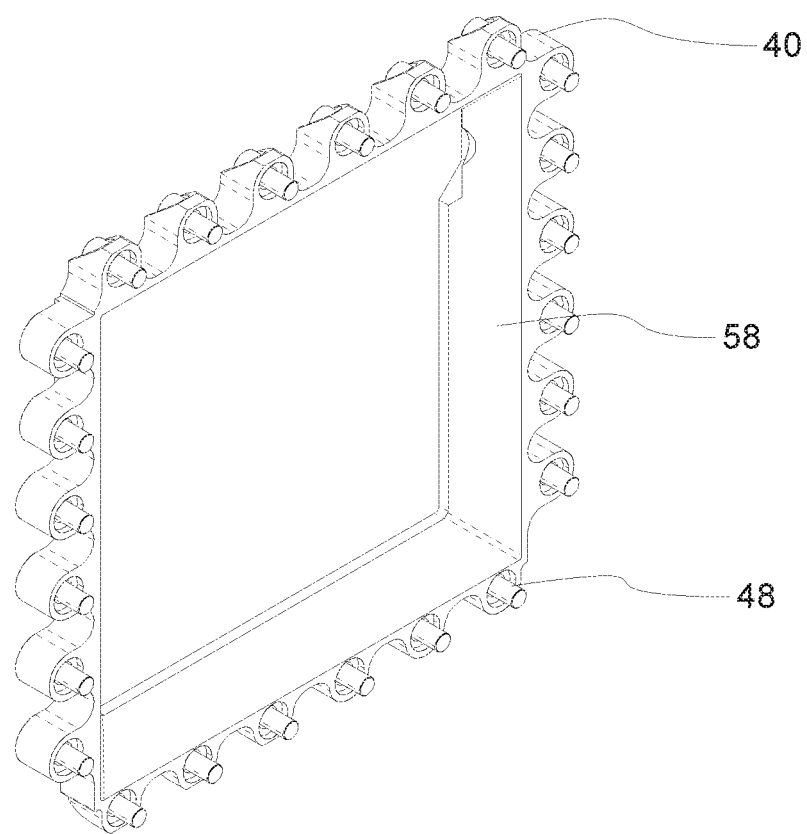
FIG. 8 illustrates a perspective view of an outer frame of an isolator of the low-profile shock isolating payload mounting assembly of FIG. 3.

FIG. 3 illustrates the low-profile shock isolating payload mounting assembly 16 of FIG. 1 separated from the body 12 and the payload 14. FIG. 4 illustrates the low-profile shock isolating payload mounting assembly 16 reversed from the view of FIG. 3. With reference to FIGS. 1-11, the low-profile shock isolating payload mounting assembly 16 comprises a first mount 18, a second mount 20, and an isolator 28 (see FIG. 5). Each of the first and second mounts 18, 20 can be configured to mount to either the body 12 or the payload 14. The first mount 18 is configured to mount to the body 12 at the payload support surface 13 and the second mount 20 is configured to mount to the payload 14. However, in other examples the roles can be reversed, with the first mount 18 configured to mount to the payload 14 and the second mount 20 configured to mount to the payload support surface 13 of the body 12.

The first mount 18 can be configured to mount to the body 12 using conventional means such as threaded fasteners, weldments, adhesives, and rivets. Although not intended to be limiting in any way, the first mount 18 can be mounted to the body 12 using threaded fasteners (not shown). The first mount 18 can have threaded sockets 22 and the body 12 can have corresponding apertures 23 for receiving a shaft of a threaded fastener. Thus, the first mount 18 can be secured to the body 12 by passing a shaft of a threaded fastener through an aperture 23 of the body 12 and into a corresponding threaded socket 22 of the first mount 18 and tightening the fastener. The first mount 18 can be configured to mount to the payload support surface 13 of the body 12 by suitably configuring the shape of the first mount 18. In this example, the first mount 18 can have at least one curved surface 24 that complements the payload support surface 13 of the body 12. As used herein, with respect to two complementary surfaces, the term "complement" is intended to mean that the surfaces are designed and configured to work together to perform an intended function. In one aspect, the complementary surfaces can be configured to directly interface with one another, such as in the example of the curved surface 24 of the first mount 18 interfacing directly with (i.e., mounting to) the payload support surface 13 of the body 12. In another aspect, the complementary surfaces can be configured to indirectly interface with one another, such as in the example of the inclined surface 36 of the second mount 20 indirectly interfacing with the isolator support leg 44 of the inner frame 38 by way of the inner isolator pad 54 situated between them. Those skilled in the art will recognize that complementary surfaces can comprise two surfaces that are oriented along parallel planes, two surfaces that have the same or similar curvature, two surfaces that are non-parallel to one another, and others. Additionally, the threaded sockets 22 can be angled relative to one another to account for the curvature of the body 12 and the distance between the apertures 23. In other examples, the first mount 18 can be modified as necessary to conform to the shape of the payload support surface 13 to which the first mount 18 is being secured.

The second mount 20 can be configured to mount to the payload 14 using conventional means such as threaded fasteners, weldments, adhesives, and rivets. Again, not intending to be limiting in any way, the second mount 20 can be mounted to the body 12 using threaded fasteners (not shown). For example, the payload 14 can have threaded sockets for receiving a threaded end of a fastener and the second mount 20 can have apertures 26 that correspond to the threaded sockets of the payload 14. Thus, the second mount 20 can be secured to the payload 14 by passing a threaded fastener through an aperture 26 and into a corresponding threaded socket of the payload 14 and tightening the threaded fastener.

The low-profile shock isolating payload mounting assembly 16 comprises the first mount 18, the second mount 20, and an isolator 28. The first and second mounts 18, 20 are movable relative to one another and are connected by the isolator 28. The isolator 28 operates to dampen vibration and shock propagating between the first and second mounts 18, 20.

As described previously, the first and second mounts 18, 20 can be configured to be secured to one of the body 12 and the payload 14 using conventional means. The second mount 20 can comprise a first side 30 configured to couple to one of the body 12 and the payload 14 and a second side 32 opposing the first side 30. At least one riser 34 can extend from the second side 32 and is offset axially from the second side 32. The at least one riser 34 can have at least one inclined surface 36 extending to the second side 32. The isolator 28 can comprise an inner frame 38 and an outer frame 40.

The inner frame 38 can comprise a platform 42 and at least one isolator support leg 44 extending from the platform 42. The at least one isolator support leg 44 can be inclined so as to be complementary to the at least one inclined surface 36 of the second mount 20. For example, if the at least one inclined surface 36 had an angle of 45 degrees relative to axis 8 of FIG. 5 the at least one isolator support leg 44 can also have an angle of 45 degrees relative to axis 8 of FIG. 6. The at least one isolator support leg can have a planar shape that is substantially flat. In other examples, such as that of FIGS. 12-22 described below, an isolator support leg can have a curved shape, or any other shape or configuration as will be apparent to those skilled in the art. In some examples, the isolator support legs 44 can be configured to as to flex about and relative to the platform 42, thus the isolator support legs 44 can be considered as compliant isolator support legs 44 capable of flexing under an applied load. The amount of flex can be tuned by configuring various properties of the isolator support legs 44, such as their length and thickness, and the way they attach or are formed with the platform 42.

The example platform 38 comprises four isolator support legs 44, but in other examples, more or less isolator support legs are contemplated. In some examples a platform 38 can have three isolator support legs arranged in a triangular shape. In other examples, a platform can have greater than four isolator support legs 44 arranged in a regular pattern.

The inner frame 38 can be configured to couple to the first mount 18 using conventional means. In some examples, the inner frame 38 can couple to the first mount 18 by way of threaded fasteners 46 (see FIG. 6) that thread into corresponding threaded sockets 47 of the platform 42. The threaded fasteners 46 pass through apertures of the first mount 18 and are secured within the threaded sockets 47 of the platform 42 to secure the first mount 18 to the inner frame 38.

The isolator 28 can further comprises an inner isolator pad 54, an outer isolator pad 56, or both. The inner and outer isolator pads 54, 56 can each fasten or otherwise secure to the at least one isolator support leg 44 using conventional means such as an adhesives, rivets, other fasteners, or in some examples they can be separate from the at least one isolator support leg 44. Each isolator support leg of the at least one isolator support legs 44 can have a corresponding inner and outer isolator pad 54, 56. When assembled (see FIG. 9), the inner isolator pad 54 can be situated between at least one inclined surface 36 of the second mount 20 and at least one isolator support leg 44, and the outer isolator support pad 56 can be situated between a at least one rail 58 (see FIG. 7) of the outer frame 40 and the at least one isolator support leg 44. In some examples, the inner and outer isolator pads 54, 56 can comprise an elastomeric material such as rubber, polyurethane, nitrile, and silicone. In some examples, each of the inner and outer isolator pads 54, 56 can comprise the same material, while in other examples different materials or durometers may be used. It is contemplated that the inner and outer isolator pads 54, 56 can be formed of any material or combination of materials capable of attenuating and absorbing shock loads propagating between the first and second mounts and within the low-profile shock isolating payload mounting assembly 16 that could cause damage, malfunction or undesirable performance in or to the payload 14. In addition, different sizes, shapes, configurations, types and makeup of the inner and outer isolator pads 54, 56 can be used to tune the isolator 28 to sufficiently attenuate shock loads in different applications or under different operating conditions.

The outer frame 40 can be configured to couple to the second mount 20 using conventional means. In some examples, the outer frame 40 couples to the second mount 20 by way of threaded fasteners 48 that thread into corresponding threaded sockets of the second mount 20. The threaded fasteners 48 pass through apertures of the outer frame 40 and are secured within the threaded sockets of the second mount 20. The outer frame 40 comprises at least one rail 58 that is complementary to the at least one isolator support leg 44. For example, if the at least one isolator support leg 44 comprises three isolator support legs, then the outer frame can comprise three rails 58 that are each complementary to an isolator support leg, and if an angle of the at least one isolator support leg 44 is orientated at an angle of 45 degrees from axis 8, then the at least one rail 50 can similarly be inclined at 45 degrees relative to axis 8. As will be shown in FIG. 10, when assembled, the at least one isolator support leg 44 is captured between the at least one rail 50 of the outer frame 40 and the at least one inclined surface 36 of the second mount 20. The outer frame 40 can further comprise an opening 52 to facilitate access to the platform of the inner frame 38. For example, when assembling the low profile isolating payload mounting assembly, the outer frame 40 can be placed over the inner frame 38 and the threaded fasteners 46 of the inner frame 38 can be accessed and manipulated to secure the inner frame 38 to the second mount 20.

Figure 11:
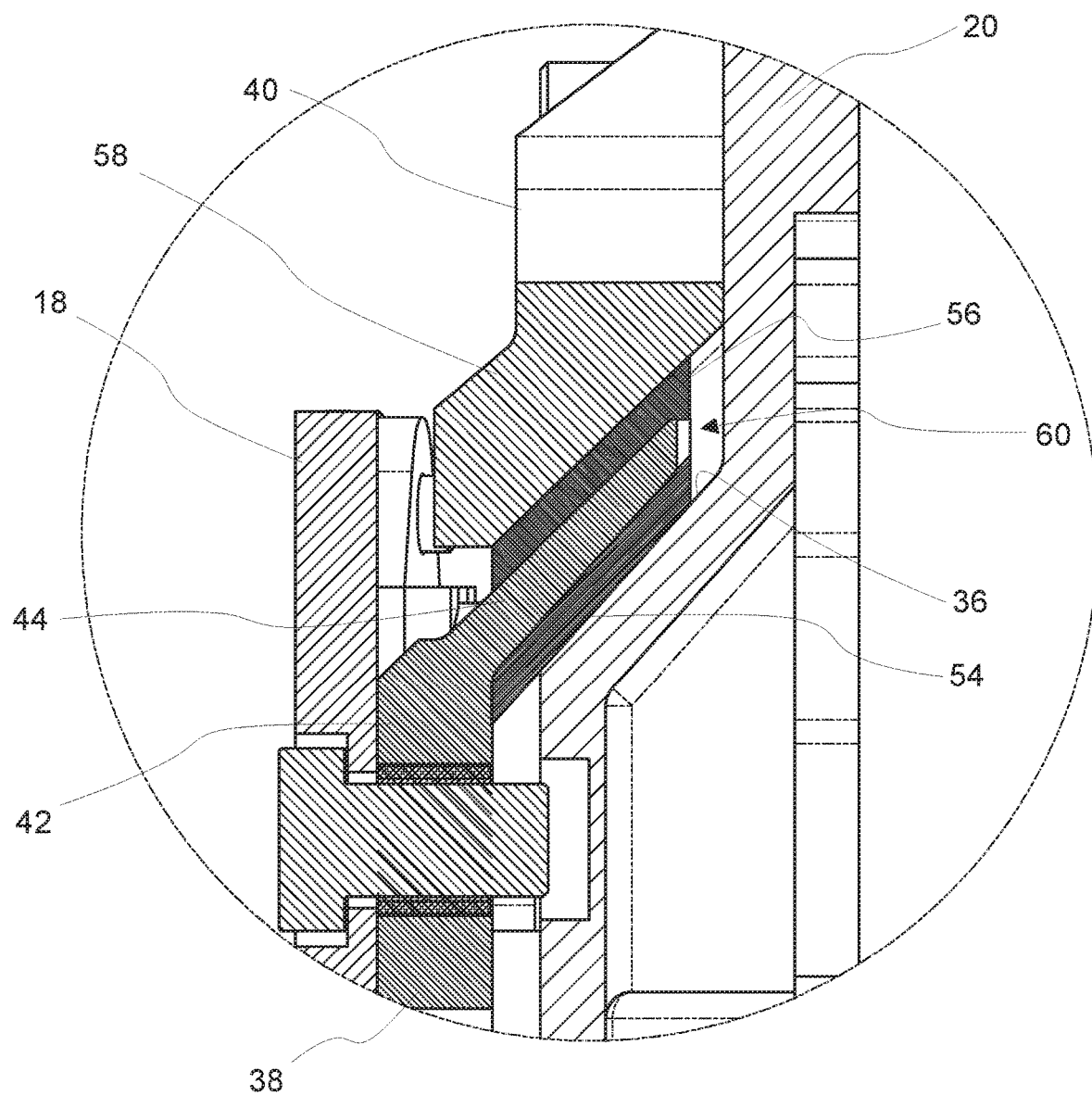
FIG. 11 illustrates a detailed cross-sectional view of the low-profile shock isolating payload mounting assembly of FIG. 3 taken about Detail A of FIG. 10.
Figure 12:
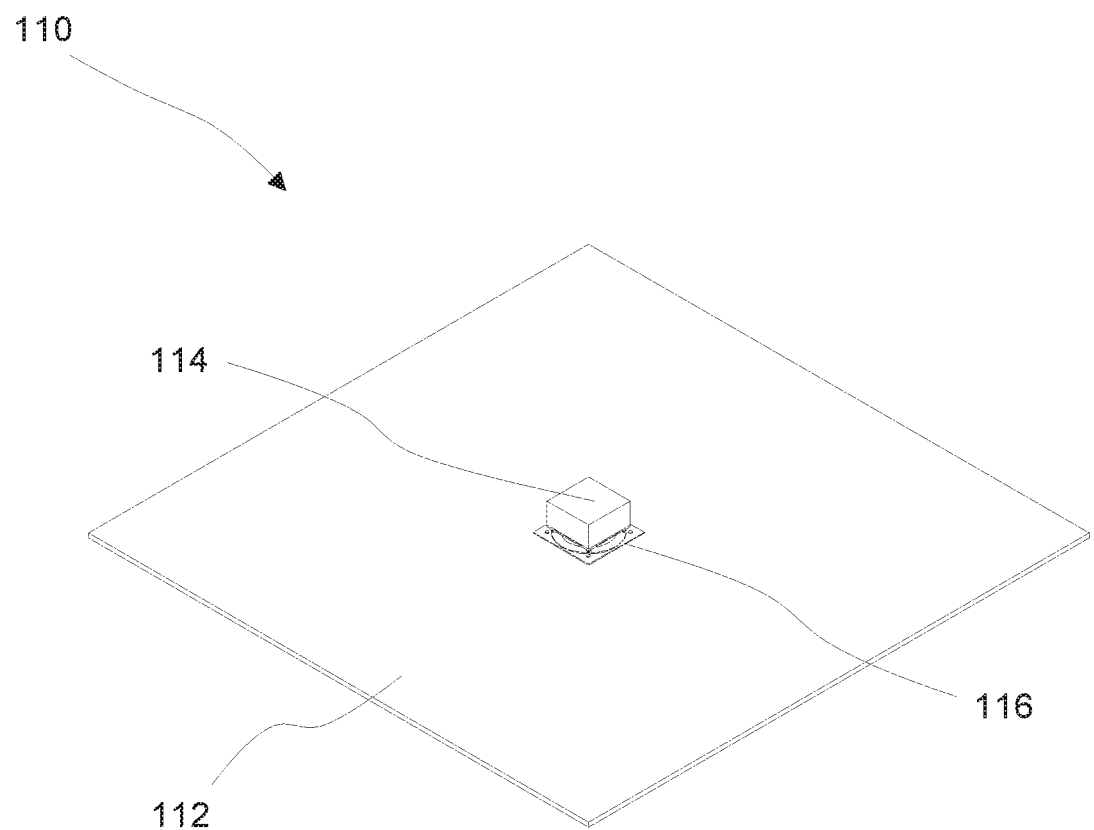
FIG. 12 illustrates a perspective view of a payload system showing a low-profile shock isolating payload mounting assembly coupling a payload to a generic body in accordance with an example of the present disclosure.
Figure 13:
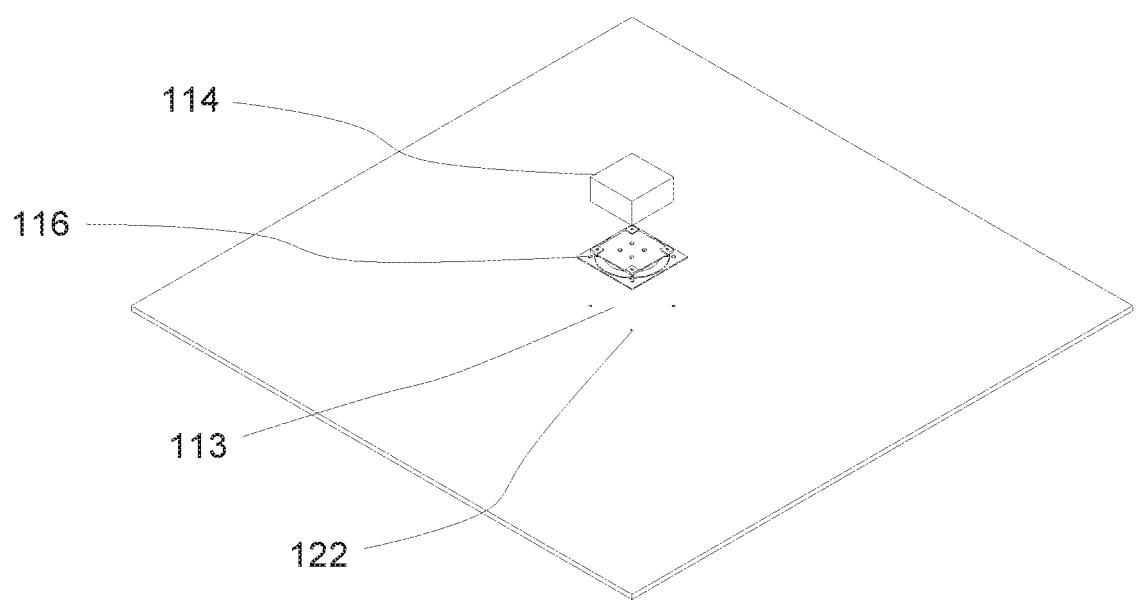
FIG. 13 illustrates an exploded view of the payload system and the low-profile shock isolating payload mounting assembly of FIG. 12.
Figure 14:
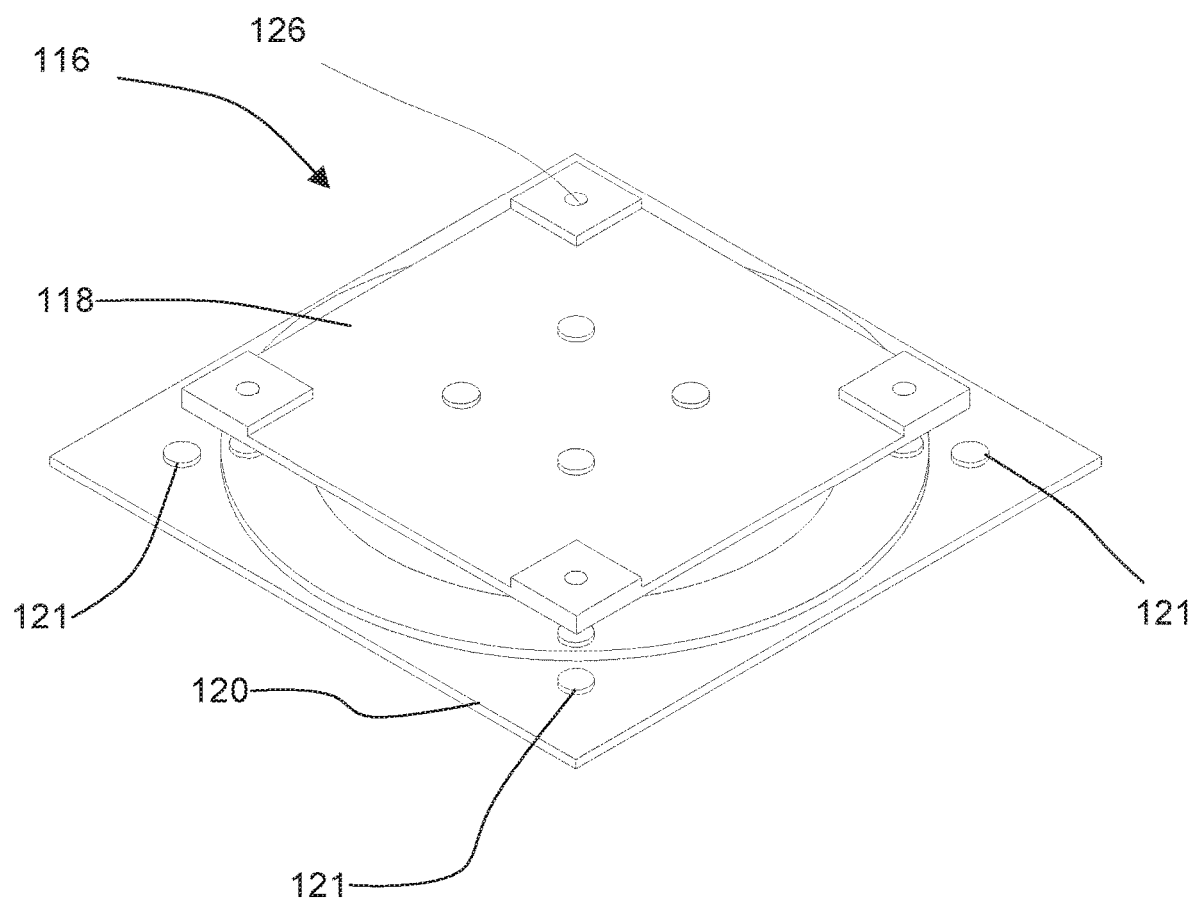
FIG. 14 illustrates a first perspective view of the low-profile shock isolating payload mounting assembly of FIG. 12 isolated from other components of the payload system.
Figure 15:
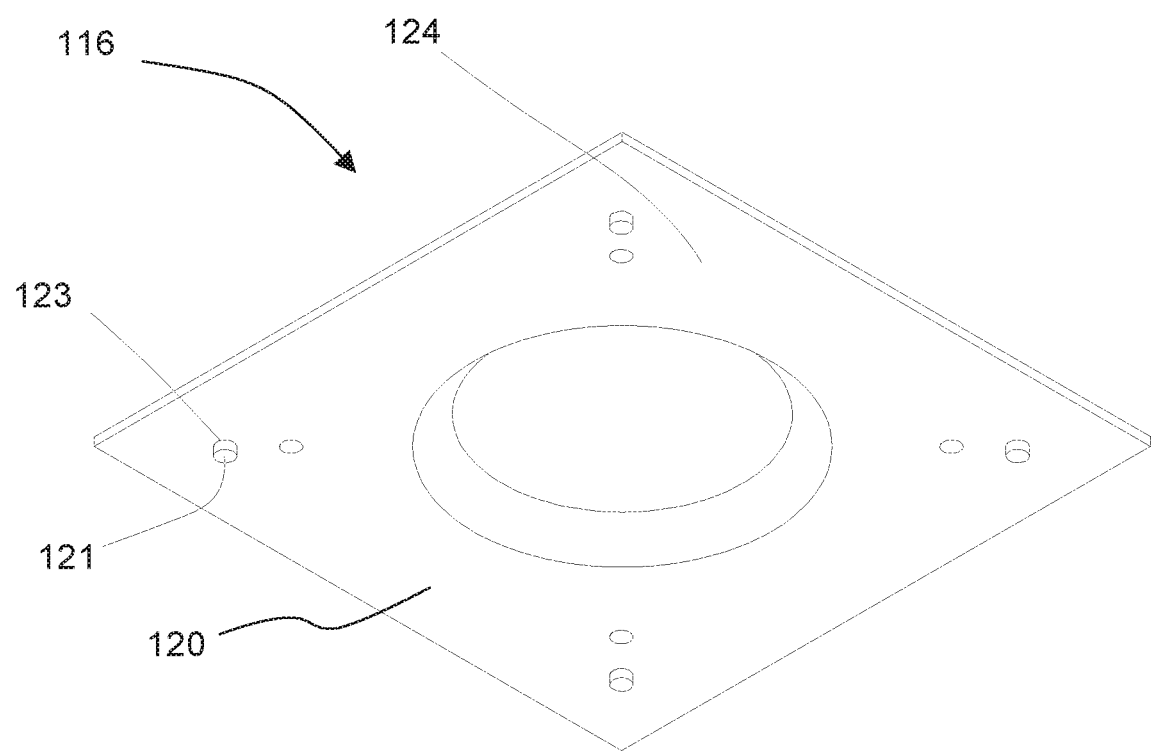
FIG. 15 illustrates a second perspective view of the low-profile shock isolating payload mounting assembly of FIG. 12 isolated from other components of the payload system.

The inner frame 38 can be secured by the interaction of the second mount 20 and the outer frame 40 (see FIG. 11). When assembled (see FIG. 10), the inner frame 38 can nest within the opening of the outer frame 40 to reduce the axial profile of the isolator 28. When the outer frame 40 is secured to the second mount 20, a gap 60 is created between the at least one inclined surface 36 of the second mount 20 and the at least one rail 58 of the outer frame 40 (see FIG. 11). The at least one isolator support leg 44 extends from the platform 42 and into the gap 60. Together, the inner isolator pad 54, the at least one isolator support leg 44, and the outer isolator pad 56 can have a thickness that is slightly greater than a width of the gap 60, Thus, when the outer frame 40 is secured to the second mount 20, the inner isolator pad 54, the at least one isolator support leg 44, and the outer isolator pad 56 can be compressed between the at least one rail 58 and the at least one inclined surface 36 of the second mount 20. Thus, the inner frame 38 is secured by the outer frame 40 being coupled to the second mount 20. Additionally, the inner frame 38 is moveable relative to the outer frame 40 and the second mount 20 which operates to deform the isolator pads 54, 56. This deformation acts to isolate relative movement between the first and second mounts 18, 20. A low frequency vibration or large displacement can transfer between the second mount 20 and the inner frame 38, while the inner and outer isolator pads 54, 56 can dampen relative movement between the second mount 20 and the inner frame 38 at higher frequencies.

The relative amount of dampening provided by the isolator 28 can be tuned by varying one or more of the geometry of the at least one isolator support leg 44, the geometry, configuration, type and/or durometer of the inner and outer isolator pads 54, 56, the thickness of the inner and outer isolator pads 54, 56, and/or the material used to make the inner frame. For example, if a greater degree of isolation is required the inner and outer isolator pads 54, 56 may be increased in thickness or a more suitable durometer may be used. If lesser degree of isolation is required, the inner and outer isolator pads 54, 56 may be reduced in thickness, a harder material used, or these may be eliminated altogether relying on the compliance of the at least one isolator support leg 44 to provide isolation.

The flat design of the low-profile shock isolating payload mounting assembly 16 reduces the axial height compared to a conventional mount while providing isolation between the body 12 and the payload 14, Additionally, the design does not rely on the inner and outer isolator pads 54, 56 being bonded to a structure to handle the load. Indeed, since the inner and outer isolator pads 54, 56 are captured by the at least one inclined surface 36 of the second mount 20 and the rail 58, the inner and outer isolator pads 54, 56 do not need to be bonded to the at least one isolator support leg 44. Furthermore, the inner frame 38 can be completely captured by the outer frame 40 such that the inner frame 38 cannot be displaced from the low-profile shock isolating payload mounting assembly 16 without the outer frame 40 being removed.

FIGS. 12-22 illustrate another example payload system 110 comprising a body 112, a payload 114, and a low-profile shock isolating payload mounting assembly 116. In contrast to the cylindrical body of FIG. 1, the body 112 of FIGS. 12-22 is a generic panel generally representing a different body configuration than the one discussed above. For example, the body 112 could be the side, top, or bottom of a vehicle or other structure. Additionally, in this example, a first mount 118 (see FIG. 14) is configured to couple to the payload 114 and a second mount 120 (see FIG. 14) is configured to couple to the body 112.

Figure 16:
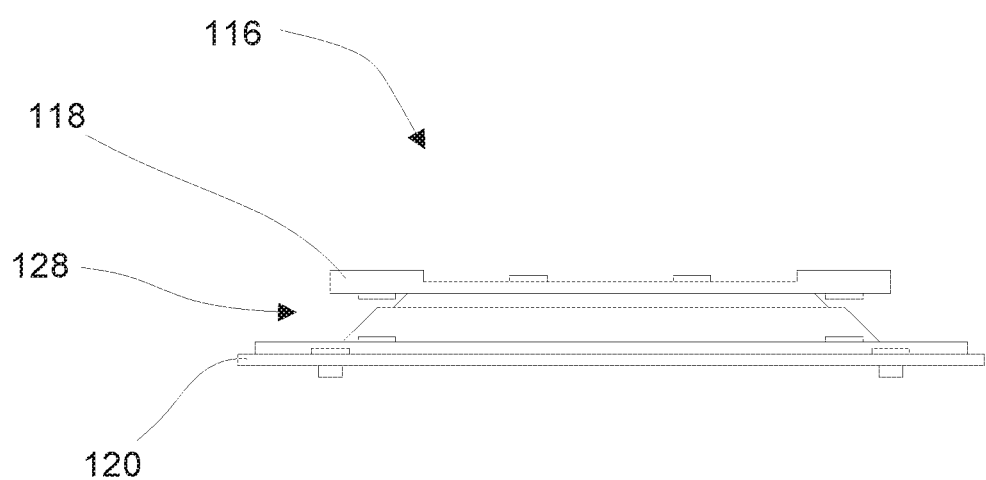
FIG. 16 illustrates a top view of the low-profile shock isolating payload mounting assembly of FIG. 14.
Figure 17:
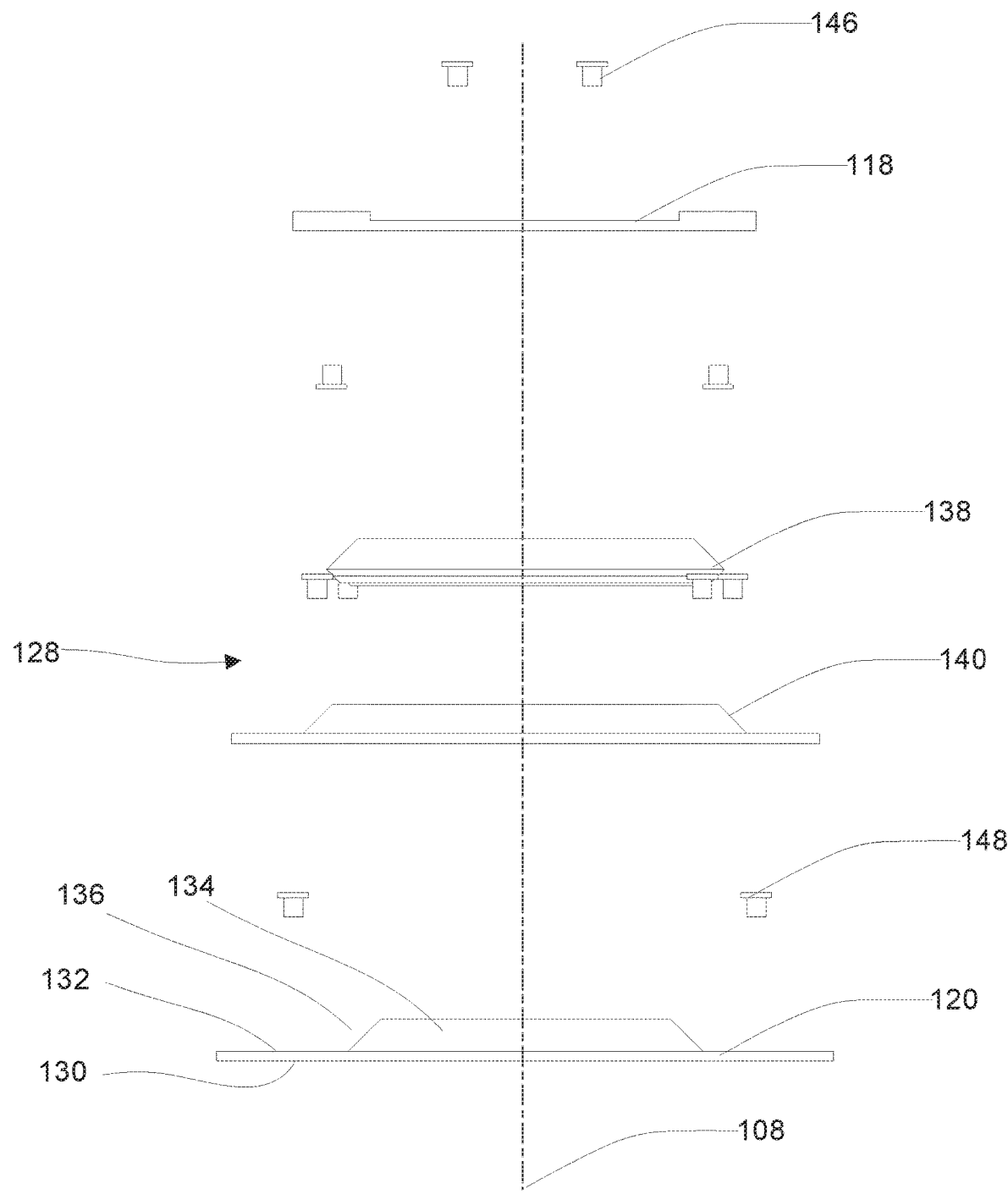
FIG. 17 illustrates an exploded top view of the low-profile shock isolating payload mounting assembly of FIG. 14.
Figure 18:
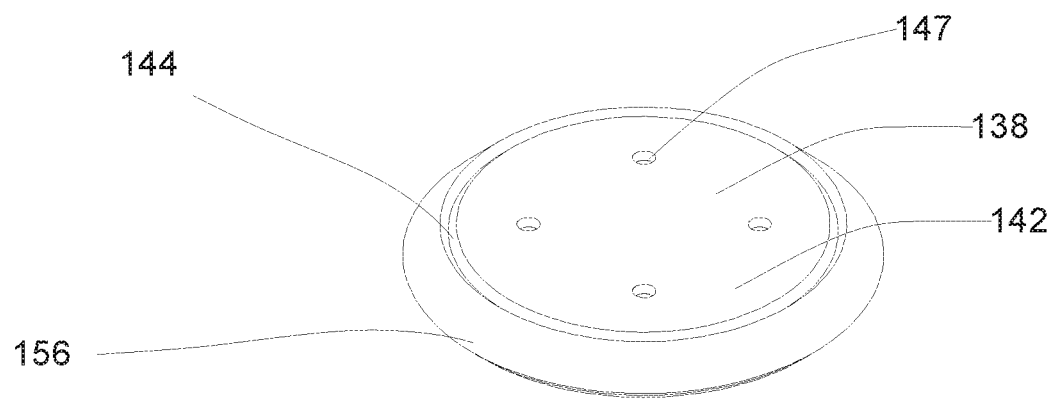
FIG. 18 illustrates a perspective view of an inner frame of an isolator of the low-profile shock isolating payload mounting assembly of FIG. 14.
Figure 19:
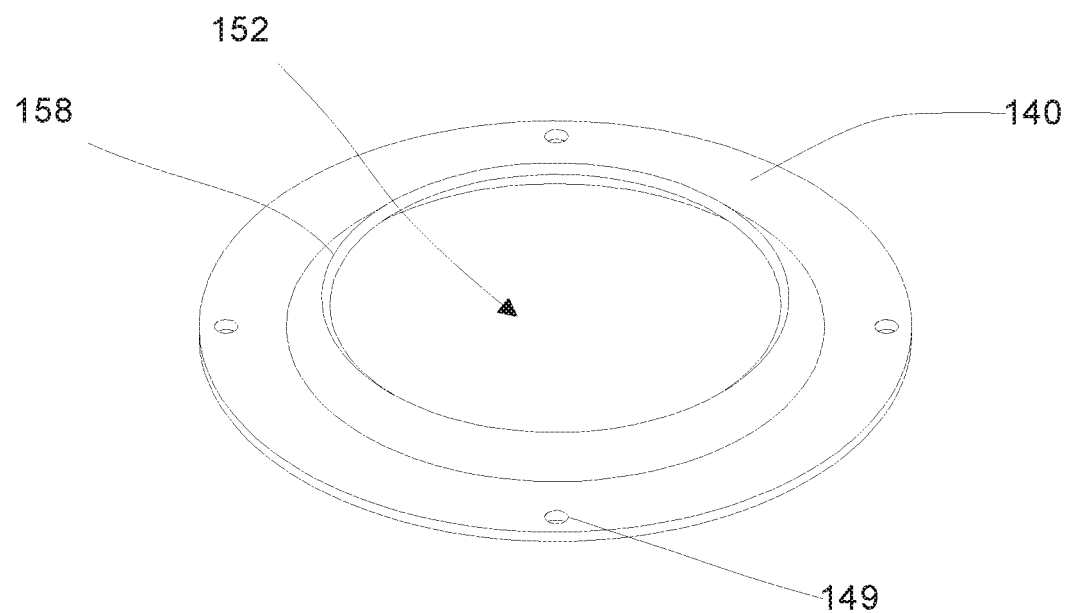
FIG. 19 illustrates a perspective view of an outer frame of an isolator of the low-profile shock isolating payload mounting assembly of FIG. 14.
Figure 20:
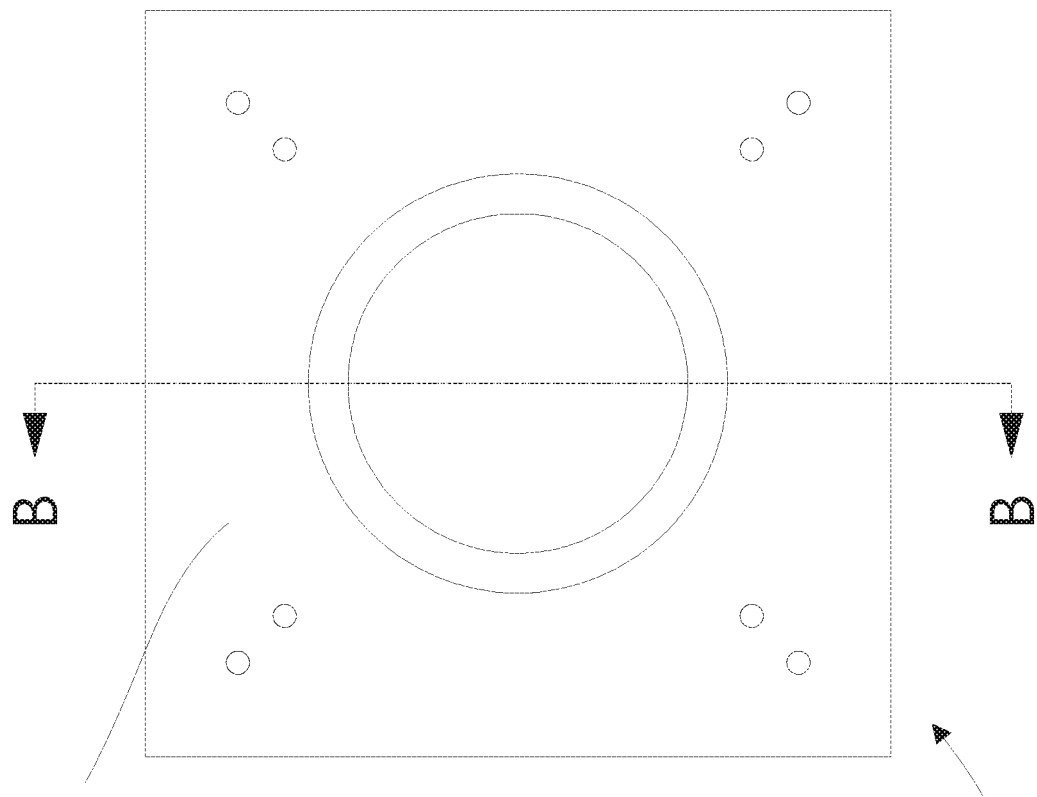
FIG. 20 illustrates a side view of the low-profile shock isolating payload mounting assembly of FIG. 14.

The low-profile shock isolating payload mounting assembly 116 comprises a first mount 118, a second mount 120, and an isolator 128 (see FIGS. 16 and 17). Each of the first and second mounts 118, 120 can be configured to mount to either the body 112 or the payload 114. In the example shown, the first mount 118 is configured to mount to the payload 114 and the second mount 120 is configured to mount the body 112 at a payload support surface 113. However, in other examples the roles can be reversed, with the first mount 118 configured to mount to the payload support surface 113 of the body 112 and the second mount 120 configured to mount to the payload 114.

Although not intending to be limiting in any way, the second mount 120 can be configured to mount to the body 112 using conventional means such as threaded fasteners, weldments, adhesives, and rivets. In the example shown, the second mount 118 is mounted to the body 112 using threaded fasteners 121. The body 112 can have threaded sockets 122 and the second mount 118 can have corresponding apertures 123 for receiving a shaft of a threaded fastener 121. Thus, the second mount 120 can be secured to the body 112 by passing a shaft of the threaded fastener 121 through the aperture 123 of the second mount 120 and into a corresponding threaded socket 122 of the body 112 and tightening the threaded fastener 121. The second mount 120 can be configured to mount to the payload support surface 113 of the body 12 by suitably configuring the shape of the second mount 120, Thus, the second mount 120 can have at least one surface 124 (e.g., a flat surface) that complements the payload support surface 113 of the body 112.

The first mount 118 can be configured to mount to the payload 114 using conventional means such as threaded fasteners, weldments, adhesives, and rivets. Again, not intending to be limiting in any way, the first mount 118 can be mounted to the payload 114 using threaded fasteners (not shown). For example, the payload 114 can have threaded sockets (not shown) for receiving a threaded end of a fastener and the first mount 118 can have apertures 126 that correspond to the threaded sockets of the payload 114. Thus, the first mount 118 can be secured to the payload 114 by passing a threaded fastener through an aperture 126 and into a corresponding threaded socket of the payload 114 and tightening the threaded fastener.

The low-profile shock isolating payload mounting assembly 116 comprises the second mount 120, the first mount 118, and an isolator 128. The first and second mounts 118, 120 are movable relative to one another and are connected by the isolator 128, The isolator 128 operates to dampen vibrations and shocks propagating between the first and second mounts 118, 120.

As described previously, the first and second mounts 118, 120 can be configured to be secured to one of the body 112 and the payload 114 using conventional means. The second mount 120 can comprise a first side 130 configured to couple to one of the body 112 and the payload 114 and a second side 132 opposing the first side 130. A riser 134 can extend from the second side 132 and is offset axially from the second side 132. The riser 134 can have a frustoconical shape having an inclined surface 136 extending to the second side 132. The isolator 128 can comprise an inner frame 138 and an outer frame 140.

The inner frame 138 can comprise a platform 142 and an isolator support leg 144 extending from the platform 142. In the example shown, the isolator support leg 144 is a conical leg. The isolator support leg 144 can be inclined so as to be complementary to the inclined surface 136 of the first mount 118. For example, if the inclined surface 136 had an angle of 45 degrees relative to axis 108 of FIG. 16, the isolator support leg 144 can also have an angle of 45 degrees relative to axis 108 of FIG. 17.

The inner frame 138 can be configured to couple to the first mount 118 using conventional means. In some examples, the inner frame 138 can couple to the first mount 118 by way of threaded fasteners 146 (see FIG. 17) that thread into corresponding threaded sockets 147 of the platform 142. The threaded fasteners 146 pass through apertures of the first mount and are secured within the threaded sockets 147 of the platform 142 to secure the first mount 118 to the inner frame 138.

Figure 21:
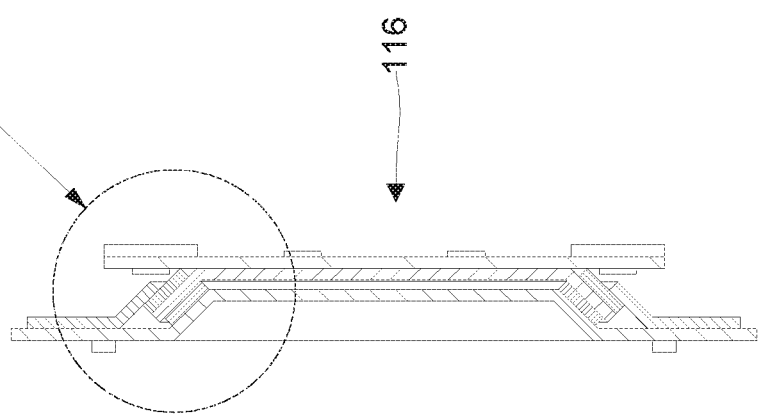
FIG. 21 illustrates a cross-sectional view of the low-profile shock isolating payload mounting assembly of FIG. 14 taken about line AA of FIG. 20.

The isolator 128 can further comprises an inner isolator pad 154, (see FIG. 21) an outer isolator pad 156, or both. The inner and outer isolator pads 154, 156 can each fastened to the isolator support leg 144 using conventional means such as an adhesives, rivets, other fasteners, or in some examples they may not be fastened to the isolator support leg 144. When assembled, as shown in FIG. 21, the inner isolator pad 154 can be situated between an inclined surface 136 of the first mount 118 and an isolator support leg 144, and the outer isolator pad 156 can be situated between a rail 158 (see FIG. 19) of the outer frame 140 and the isolator support leg 144. In some examples, the inner and outer isolator pads 154, 156 can comprise an elastomeric material such as rubber, polyurethane, nitrile, and silicone. In some examples, each of the inner and outer isolator pads 154, 156 can comprise the same material, while in other examples different materials or durometers may be used. As discussed above, the isolator pads 154, 156 are intended to be formed of any material capable of absorbing and attenuating shock loads propagating between the first and second mounts and through the low-profile shock isolating payload mounting assembly 116 and the isolator 128.

The outer frame 140 can be configured to couple to the second mount 120 using conventional means. In some examples, the outer frame 140 couples to the second mount 120 by way of threaded fasteners 148 that thread into corresponding threaded sockets of the second mount 120. The threaded fasteners 148 pass through apertures 149 of the outer frame 140 and are secured within the threaded sockets of the second mount 120, The outer frame 140 comprises a rail 158 that can be inclined to be complementary to the isolator support leg 144. For example, if the isolator support leg 144 is orientated at an angle of 45 degrees from axis 108, then the rail 158 can similarly be inclined at 45 degrees relative to axis 108. As will be shown in FIG. 21, when assembled, the isolator support leg 144 is captured between the rail 158 of the outer frame 140 and the inclined surface 136 of the second mount 120. The outer frame 140 can further comprise an opening 152 to facilitate access to the platform 142 of the inner frame 138. For example, when assembling the low-profile shock isolating payload mounting assembly 116, the outer frame 140 can be placed over the inner frame 138 and the threaded apertures 147 of the inner frame 138 can accessed and manipulated to secure the inner frame 138 to the first mount 118.

Figure 22:
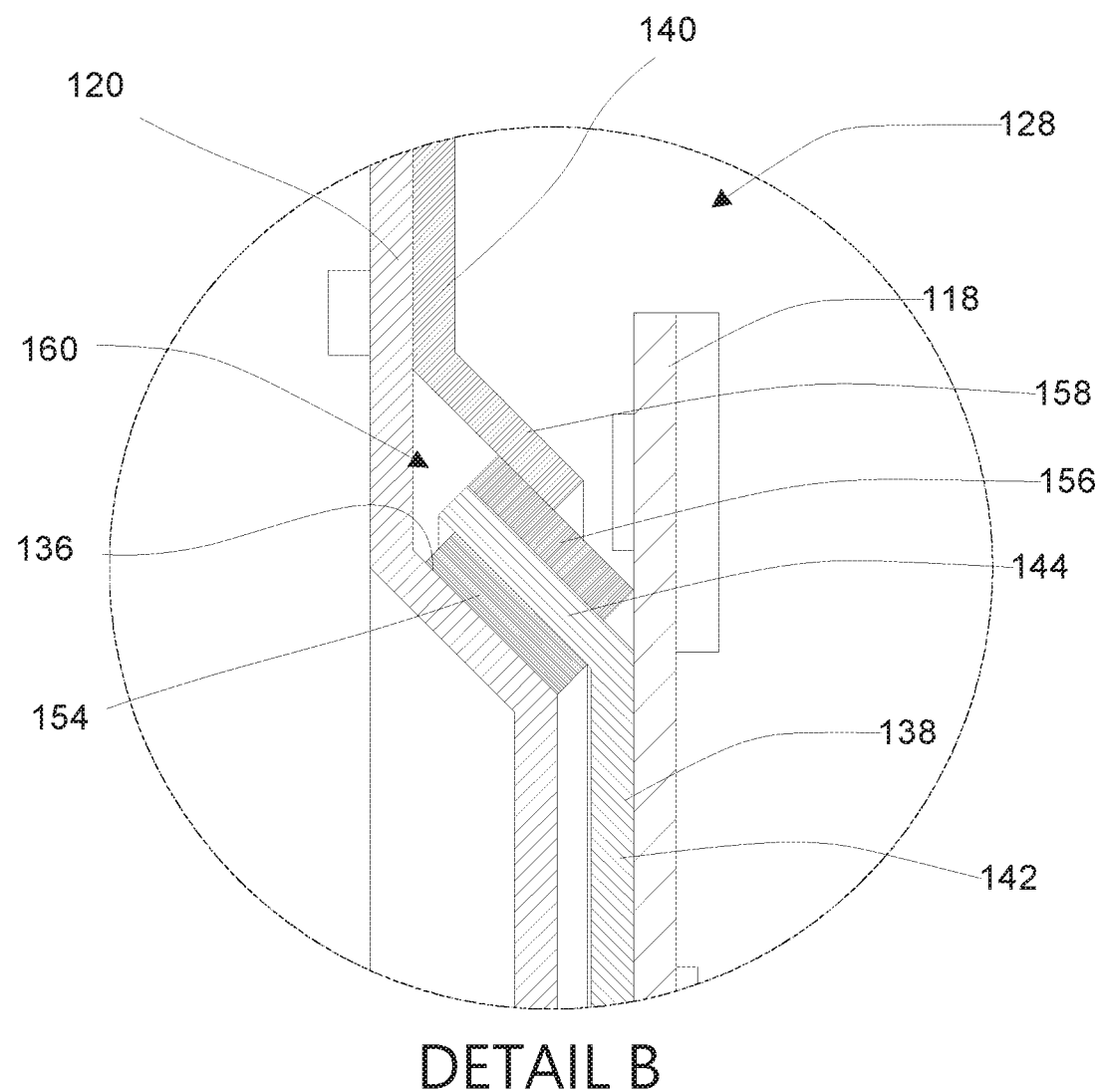
FIG. 22 illustrates a detailed cross-sectional view of the low-profile shock isolating payload mounting assembly of FIG. 14 taken about Detail B of FIG. 21.

The inner frame 138 being secured by the interaction of the second mount 120 and the outer frame 140 (see FIG. 22). When assembled (see FIG. 21), the inner frame 138 can nest within the opening of the outer frame 140 to reduce the axial profile of the isolator 128. When the outer frame 140 is secured to the second mount 120, a gap 160 is created between the at least one inclined surface 136 of the second mount 120 and the rail 158 of the outer frame 140, The isolator support leg 144 extends from the platform 142 and into the gap 160. Together, the inner isolator pad 154, the isolator support leg 144, and the outer isolator pad 156 can have a thickness that is slightly greater than a width of the gap 160. Thus, when the outer frame 140 is secured to the second mount 120, the inner isolator pad 154, the isolator support leg 144, and the outer isolator pad 156 can be compressed between the rail 158 and the inclined surface 136. Thus, the inner frame 138 is secured by the outer frame 140 being coupled to the second mount 120. Additionally, the inner frame 138 remains moveable relative to the outer frame 140 and the second mount 120 which operates to deform the isolator pads 154, 156. This deformation acts to isolate relative movement between the first and second mounts 118, 120. A low frequency vibration or large displacement can transfer between the second mount 120 and the inner frame 138, while the inner and outer isolator pads 154, 156 can dampen relative movement between the second mount 120 and the inner frame 138 at higher frequencies.

A low-profile shock isolating payload mounting assembly can be configured using conventional techniques such as machining, casting, additive manufacturing, etc. A low-profile shock isolating payload mounting assembly can be configured by forming a first mount to be operable to couple to a support surface, forming a second mount to be operable to couple to a payload and to have at least one riser comprising at least one inclined surface, forming a second mount movable relative to the first mount, the second mount comprising at least one riser comprising at least one inclined surface, forming an inner frame to have a platform operable to couple to the first mount and at least one isolator support leg extending from the platform, the at least one isolator support leg being inclined so as to be complementary to the at least one incline surface of the second mount, and forming an outer frame operable to couple to the second mount and to have an opening for facilitating access to the platform of the inner frame to be operable to couple to the first mount and to have at least one rail inclined so as to be complementary to the at least one isolator support leg.

In some examples, the low-profile shock isolating payload mounting assembly can be further configured by forming the at least one isolator support leg to have a frustoconical shape. In another example, the low-profile shock isolating payload mounting assembly can be further configured by forming the at least one isolator support leg to comprise a plurality of support legs. In some examples, the low-profile shock isolating payload mounting assembly can be further configured by attaching at least one isolator support pad to the at least one isolator support leg.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A payload mounting assembly, comprising:
    a first mount;
    a second mount movable relative to the first mount, the second mount comprising at least one riser comprising at least one inclined surface;
    an isolator comprising:
        an inner frame configured to couple to the first mount, the inner frame comprising a platform and at least one isolator support leg extending from the platform, the at least one isolator support leg being inclined so as to be complementary to the at least one inclined surface of the second mount; and
        an outer frame configured to couple to the second mount and comprising an opening for facilitating access to the platform of the inner frame, and at least one rail being inclined so as to be complementary to the at least one isolator support leg, the outer frame operating to capture the at least one isolator support leg between the at least one rail of the outer frame and the at least one inclined surface of the second mount,
    wherein, upon at least one of the first mount and the second mount being subjected to vibrations and shocks, the isolator operates to dampen vibrations and shocks propagating between the first and second mounts.

2. The payload mounting assembly of claim 1, wherein the at least one riser comprises a plurality of inclined surfaces, the inner frame comprises a plurality of isolator support legs extending from the platform, and the outer frame comprises a plurality of rails.

3. The payload mounting assembly of claim 1, wherein the isolator further comprises at least one inner isolator pad situated between an inclined surface of the at least one inclined surface of the second mount, and an isolator support leg of the at least one isolator support leg and at least one outer isolator pad situated between a rail of the at least one rail of the outer frame and the isolator support leg.

4. The payload mounting assembly of claim 3, wherein at least one of the inner isolator pad or the outer isolator pad is formed of an elastomeric material.

5. The payload mounting assembly of claim 1, wherein the inner frame is configured to nest within the outer frame.

6. The payload mounting assembly of claim 1, wherein one of the first mount and the second mount is operable to mount to a payload support surface and the other of the first mount and the second mount is operable to mount a payload to be supported by the payload support surface.

7. The payload mounting assembly of claim 1, wherein the first mount is secured to the inner frame by a first plurality of fasteners and the second mount is secured to the outer frame by a second plurality of fasteners.

8. The payload mounting assembly of claim 1, wherein the at least one isolator support leg comprises a frustoconical shape.

9. The payload mounting assembly of claim 1, wherein the at least one isolator support leg comprises a plurality of support legs.

10. A payload system comprising:
    a body having a payload support surface, wherein the body and the payload support surface are subject to vibration and shock:
    a payload supported by the payload support surface;
    a low-profile shock isolating payload mounting assembly coupling the payload to the payload support surface, the low-profile shock isolating payload mounting assembly comprising:
        a first mount coupled to one of the body and the payload;
        a second mount movable relative to the first mount and coupled to the other of the body and the payload, the second mount comprising at least one riser comprising at least one inclined surface;
        an isolator comprising:
            an inner frame configured to couple to the first mount, the inner frame comprising a platform and at least one isolator support leg extending from the platform, the at least one isolator support leg being inclined so as to be complementary to the at least one inclined surface of the second mount; and
            an outer frame configured to couple to the second mount and comprising an opening for facilitating access to the platform of the inner frame, and at least one rail being inclined so as to be complementary to the at least one isolator support leg, the outer frame operating to capture the at least one isolator support leg between the at least one rail of the outer frame and the at least one inclined surface of the second mount,
        wherein, upon at least one of the body and the payload being subjected to vibrations and shocks, the isolator is operable to dampen vibrations and shocks propagating between the body and the payload.

11. The payload system of claim 10, wherein the body comprises an elongate cylindrical body and the payload support surface comprises an interior cylindrical surface.

12. The payload system of claim 10, wherein the isolator further comprises at least one inner isolator pad situated between an inclined surface of the at least one inclined surface of the second mount and an isolator support leg of the at least one isolator support leg, and at least one outer pad situated between a rail of the at least one rail of the outer frame and the isolator support leg.

13. The payload system of claim 10, wherein the at least one isolator support leg comprises an inner isolator pad and an outer isolator pad.

14. The payload system claim 10, wherein the inner frame nests within the outer frame.

15. The low-profile shock isolating payload mounting assembly of claim 10, wherein the at least one isolator support leg comprises a frustoconical shape.

16. The low-profile shock isolating payload mounting assembly of claim 10, wherein the at least one isolator support leg comprises a plurality of support legs.

17. A method for a configuring a low-profile shock isolating payload mounting assembly, comprising:
    forming a first mount to be operable to couple to a support surface;
    forming a second mount to be operable to couple to a payload and to have at least one riser comprising at least one inclined surface;
    forming a second mount movable relative to the first mount, the second mount comprising at least one riser comprising at least one inclined surface;
    forming an inner frame to have a platform operable to couple to the first mount and at least one isolator support leg extending from the platform, the at least one isolator support leg being inclined so as to be complementary to the at least one incline surface of the second mount; and
    forming an outer frame operable to couple to the second mount and to have an opening for facilitating access to the platform of the inner frame to be operable to couple to the first mount and to have at least one rail inclined so as to be complementary to the at least one isolator support leg.

18. The method of claim 17, further comprising forming the at least one isolator support leg to have a frustoconical shape.

19. The method of claim 17, further comprising forming the at least one isolator support leg to comprise a plurality of support legs.

20. The method of claim 17, further comprising attaching at least one isolator support pad to the at least one isolator support leg.

* * * * *